(12) United States Patent
Conde et al.

(10) Patent No.: US 11,531,109 B2
(45) Date of Patent: Dec. 20, 2022

(54) TECHNOLOGIES FOR MANAGING A WORLD MODEL OF A MONITORED AREA

(71) Applicant: Intel Corporation, Santa Clara, CA (US)

(72) Inventors: Naissa Conde, San Jose, CA (US);
Suhel Jaber, San Jose, CA (US);
Pragya Agrawal, San Jose, CA (US);
Darshana Salvi, Foster City, CA (US);
Petrus van Beek, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 16/370,990

(22) Filed: Mar. 30, 2019

(65) Prior Publication Data

US 2019/0228647 A1 Jul. 25, 2019

(51) Int. Cl.
| | |
|---|---|
| *G01S 17/87* | (2020.01) |
| *G08G 1/01* | (2006.01) |
| *G08G 1/0967* | (2006.01) |
| *G05D 1/02* | (2020.01) |
| *G05D 1/00* | (2006.01) |
| *G01S 17/89* | (2020.01) |

(52) U.S. Cl.
CPC .............. *G01S 17/87* (2013.01); *G01S 17/89* (2013.01); *G05D 1/0088* (2013.01); *G05D 1/0276* (2013.01); *G08G 1/0116* (2013.01); *G08G 1/0145* (2013.01); *G08G 1/096725* (2013.01); *G05D 2201/0213* (2013.01)

(58) Field of Classification Search
CPC .............. G05D 1/0276; G05D 1/0088; G05D 2201/0213; G08G 1/04; G08G 1/0116; G08G 1/0133; G08G 1/0141; G08G 1/096725; G08G 1/0145; G01S 17/87; G01S 17/89

See application file for complete search history.

(56) References Cited

U.S. PATENT DOCUMENTS

| | | | |
|---|---|---|---|
| 10,661,795 B1* | 5/2020 | Li | B60W 30/0956 |
| 10,699,564 B1* | 6/2020 | Lewis | H04W 4/38 |
| 10,909,866 B2* | 2/2021 | Jacobus | B60W 10/04 |
| 2014/0195138 A1* | 7/2014 | Stelzig | G08G 1/0133 701/119 |
| 2016/0097849 A1* | 4/2016 | Nichols | G08G 1/096716 342/107 |
| 2018/0129215 A1* | 5/2018 | Hazelton | B60W 40/04 |
| 2020/0111358 A1* | 4/2020 | Parchami | G05D 1/028 |

* cited by examiner

Primary Examiner — Ramsey Refai
(74) Attorney, Agent, or Firm — Alliance IP, LLC

(57) ABSTRACT

Technologies for managing a world model of a monitored area includes a roadway server configured to receive LIDAR sensing data from a LIDAR sensing system positioned to monitor the monitored area and generate a world map of the monitored area based on the LIDAR sensing data. The world model includes data that identifies objects located in the monitored area. The roadway server may distribute the world model to automated vehicles traveling through the monitored area via a stream or in response to directed requests. The roadway server may also receive sensor data from the automated vehicles, which may be used to generate the world model. The roadway server may distribute the world model to other interested devices located in or near the monitored area.

19 Claims, 7 Drawing Sheets

TECHNOLOGIES FOR MANAGING A WORLD MODEL OF A MONITORED AREA

BACKGROUND

An autonomous vehicle is a vehicle that is capable of sensing a surrounding environment and navigating through the environment to reach a predetermined destination, typically without further input from a vehicle operator. To do so, the autonomous vehicle includes various sensors, such as lasers, radar, global positioning system (GPS), and computer vision technologies, to facilitate navigation. A vehicle control system incorporated within the autonomous vehicle may process the sensor data to identify appropriate navigation paths, obstacles, relevant signage, and other navigational data. Of course, some "autonomous" vehicles may be semi-autonomous and require operator input, confirmation, and/or oversight.

The quality of the sensors used by a particular autonomous vehicle can vary based on various factors such as the cost of the vehicle. Light Detection and Ranging (LIDAR) sensors have been shown to perform well for autonomous vehicle navigation, but are considered expensive and intrusive to incorporate in most consumer-level autonomous vehicles. As such, some autonomous vehicles may rely on cameras, radar, and other technologies to facilitate navigation, which may provide an inferior navigation system compared to those using LIDAR sensors. Improved navigation capabilities may become more important as the number of autonomous vehicles increase, as well as under certain conditions or locations (e.g., at a busy intersection). Additionally, the variety of navigation systems used by the various autonomous vehicles on a particular roadway may produce world models (e.g., data models identifying objects of the local environment) that differ between the autonomous vehicles. Such differences in the world models used by the autonomous vehicles for navigation can present additional dangers.

However, the incorporation of LIDAR systems into every autonomous vehicle may be impractical due to several factors. For example, the LIDAR system may be too costly for some autonomous vehicles. Additionally, typical LIDAR systems require complex computation, which may not be available on all vehicles. As such, it is expected future autonomous vehicles will continue to rely on diverse navigation sensors such as cameras and radar.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
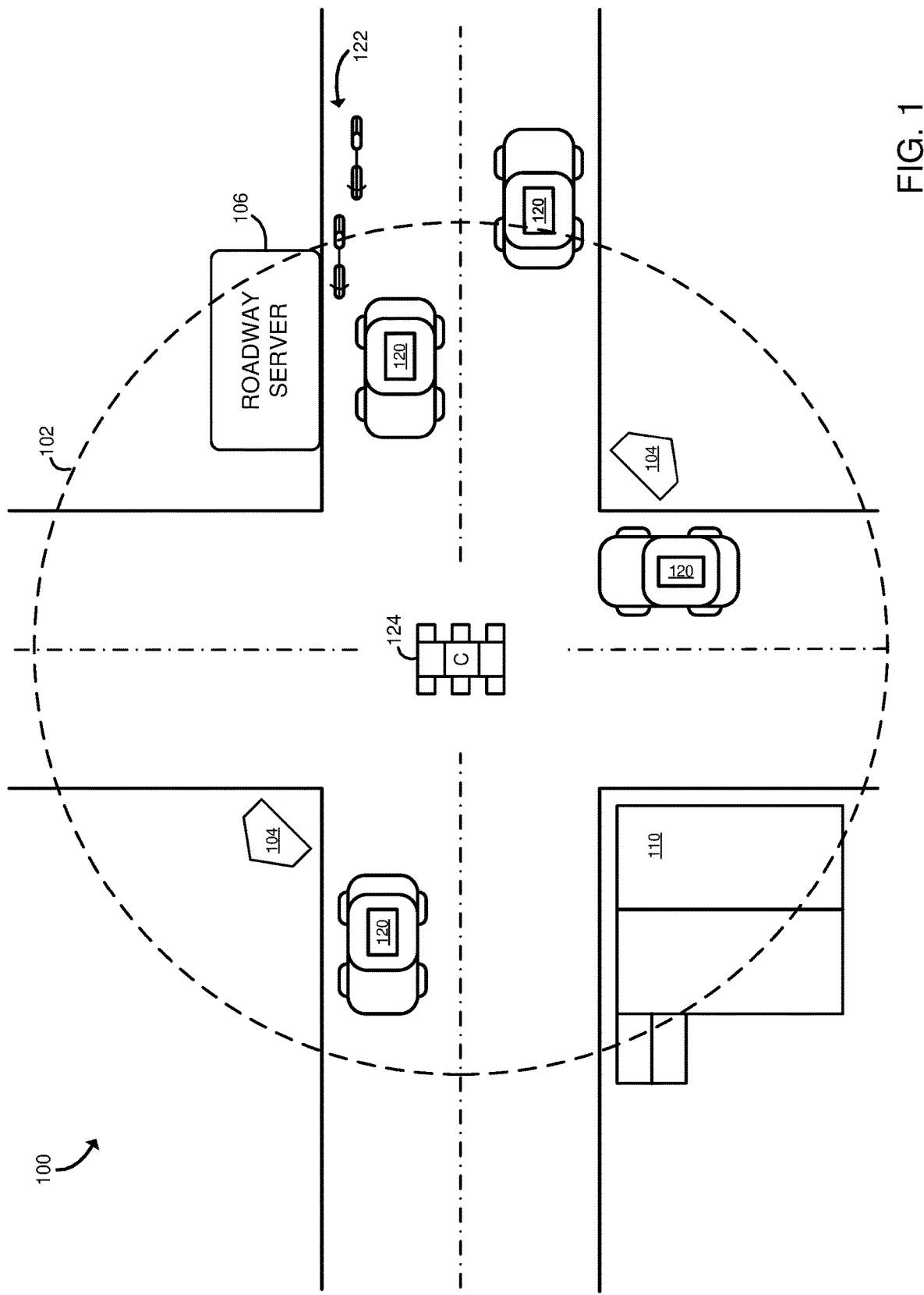
FIG. 1 is a simplified block diagram of at least one embodiment of a system for managing a world model of a monitored area.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, an illustrative system 100 for managing a world model of a monitored area 102 includes one or more Light Detection and Ranging (LIDAR) sensing systems 104 located in or near the monitored area 102 and one or more roadway servers 106, which are in communication with the LIDAR sensing systems 104. In use, the LIDAR sensing systems 104 are configured to monitor the monitored area 102 to generate LIDAR sensing data indicative of objects located in the monitored area 102 or from which such objects can be detected. For example, the LIDAR sensing data may include data indicative of static objects such as a building 110, traffic signs, traffic signals, billboards, curbs and other roadway boundaries, and/or other objects that are stationary within the monitored area 102. Additionally, the LIDAR sensing data may include data indicative of dynamic objects such as vehicles 120, bicycles 122, pedestrians, and other objects in motion within the monitored area 102. Depending on the particular embodiment, as discussed in more detail below, the LIDAR sensing data may be embodied as raw LIDAR sensor data, three dimensional (3D) point cloud data, or object-detected data that is directly indicative of the objects located in the monitored area 102 (e.g., data directly usable by an automated vehicle 120 to perform navigation through the monitored area 102).

The LIDAR sensing systems 104 transmit the LIDAR sensing data to the roadway server 106, which is also located within or near the monitored area 102 (e.g., at an edge of the roadway). As discussed in more detail below, the roadway server 106 is configured to aggregate the LIDAR sensing data from the LIDAR sensing systems 104 to generate or update a world model of the monitored area. In doing so, in some embodiments, the roadway server 106 may also receive sensor data from other sensors within or near the monitored area 102 such as vehicle sensing data from one or more vehicles 120 traveling through the monitored area and sensing data from other fixed sensors located within the monitored area 102 such as a traffic camera 124. In fusing or aggregating the sensing data received from the multiple sources, the roadway server 106 may weigh the various sensing data differently based on a confidence score or value assigned to each received data. For example, the LIDAR sensing data received from the LIDAR sensing systems 104 may have a high confidence score than the vehicle sensing data received from a particular automated vehicle 120.

The roadway server 106 may generate the world model of the monitored area 102 by processing the aggregated sensing data using various algorithms. For example, the roadway server 106 may perform an object detection and/or recognition process on the aggregated sensing data to identify static and dynamic objects located in the monitored area. In this way, the world model includes data identifying such objects and is usable by automated vehicles 120 to facilitate navigation through the monitored area. For example, the automated vehicles 120 may include autonomous vehicles capable of using the world model to directly control navigation of the autonomous vehicle, as well as lesser automated vehicles that may still use the world model to provide additional features or support for a driver of the vehicle such as additional information or otherwise control sub-systems of the vehicle (e.g., to control braking).

As such, the roadway server 106 is further configured to transmit the world model to interested automated vehicle 120 entering the monitored area 102. It should be appreciated that the world model provides a consistent model of the monitored area 102 for each subscribed automated vehicle 120, which may increase safety of the monitored area 102. Additionally, it should be appreciated that the generation of the world model is offloaded to the roadway server 106, which may also allow the automated vehicles 120 to incorporate less accurate or inexpensive navigation sensors and compute power, while still benefiting from the consistent world model of the monitored area. Additionally, as discussed below, the world model may be provided to the automated vehicle 120 prior to entering the monitored area, which may allow the automated vehicle 120 to make improved navigation decisions and driving plans.

In some embodiments, the roadway server 106 may also determine events, such as traffic congestion or accidents, occurring in the monitored area based on the generated world model and transmit such event information to the automated vehicles 120. Furthermore, the roadway server 106 may provide the world information (i.e., the world model and event information) to other interested entities such as emergency services, surveillance or security services, infrastructure or maintenance services, traffic management services, commerce services, and/or other interested entities. Of course, the amount and type of data provided to such interested entities, including the automated vehicles 120, may differ based on the identity of the interested entities.

Figure 2:
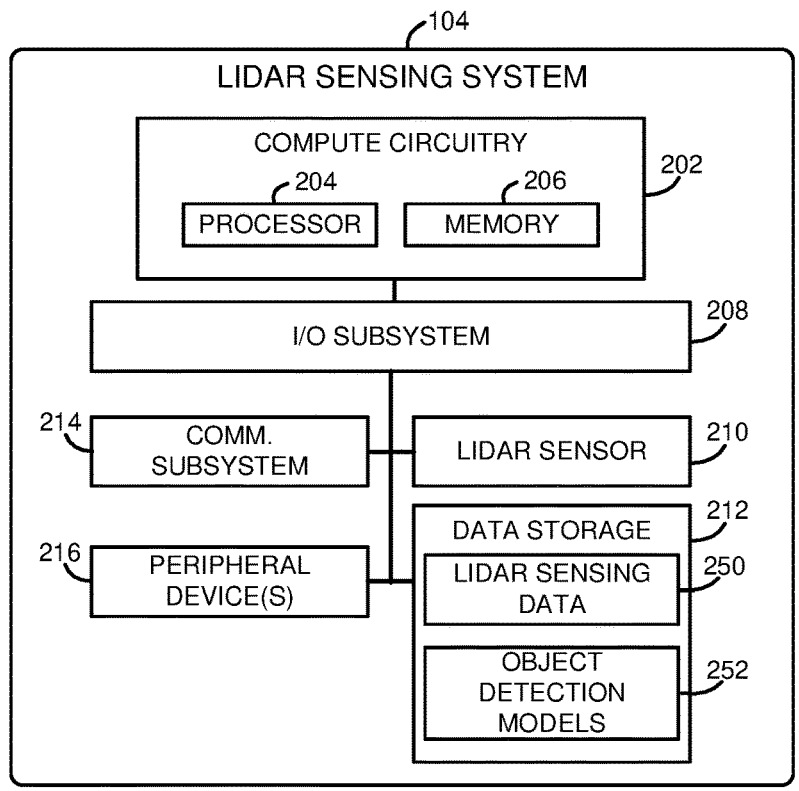
FIG. 2 is a simplified block diagram of at least one embodiment of a LIDAR sensing system of FIG. 1.

Referring now to FIG. 2, each LIDAR sensing system 104 may be embodied as any type of sensing device or collection of devices capable of generating LIDAR-based sensing data of the monitored area 102. Although the illustrative system 100 includes two LIDAR sensing systems 104, it should be appreciated that the system 100 may include additional or fewer LIDAR sensing systems 104 in other embodiments based on, for example, the size and/or complexity of the monitored area 102. The LIDAR sensing systems 104 may be mounted in appropriate locations to monitor the area 102 and the specific locations of the LIDAR sensing systems 104 may also depend on the size and/or complexity of the monitored area 102. Multiple LIDAR sensing systems 104 may be positioned such that their corresponding field of view overlap each other and the monitored area 102. As discussed in more detail below, the LIDAR sensing systems 104 may have different levels of compute capabilities, depending on the desired type of LIDAR sensing data to be generated by the corresponding LIDAR sensing system 104 (e.g., whether the LIDAR sensing system 104 is to generate raw LIDAR sensor data, 3D cloud point data, or object-based sensing data).

The illustrative LIDAR sensing system 104 of FIG. 2 includes compute circuitry 202, an input/output ("I/O") subsystem 208, a LIDAR sensor 210, a data storage 212, a communication subsystem 214, and, optionally, one or more peripheral devices 216. Of course, it should be appreciated that the LIDAR sensing system 104 may include other or additional components, such as those commonly found in a typical LIDAR sensor or LIDAR system, in other embodiments. Additionally, in some embodiments, one or more of the illustrative components may be incorporated in, or otherwise form a portion of, another component.

The compute circuitry 202 may be embodied as any type of device or collection of devices capable of performing various compute functions (e.g., object detection) as described below. In some embodiments, the compute circuitry 202 may be embodied as a single device such as an integrated circuit, an embedded system, a field-programmable-array (FPGA, a system-on-a-chip (SOC), or other integrated system or device. Additionally, in some embodiments, the compute circuitry 202 includes or is embodied as a processor 204 and memory 206. The processor 204 may be embodied as any type of processor capable of performing the functions described herein. For example, the processor 204 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein.

The compute circuitry 202 is communicatively coupled to other components of the LIDAR sensing system 104 via the I/O subsystem 208, which may be embodied as circuitry and/or components to facilitate input/output operations with compute circuitry 202 (e.g., with the processor 204 and/or memory 206) and other components of the LIDAR sensing system 104. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may be incorporated, along with the processor 204, the memory 206, and other components of the LIDAR sensing system 104, into the compute circuitry 202.

The LIDAR sensor 210 may be embodied as any type of sensor configured to use LIDAR sensing technology to generate raw LIDAR sensing data. Because the LIDAR sensing system 104 is fixed and not incorporated on a vehicle, it should be appreciated that the LIDAR sensor 210 may have increased capabilities over those LIDAR sensors typically incorporated in autonomous vehicles. For example, the LIDAR sensor 210 may have a wider field of view, increased vertical and/or horizontal resolution, an increased range, and/or an increased distance accuracy over typical automotive-based LIDAR sensors. Additionally, because the LIDAR sensor 210 is fixed or stationary compared to automotive LIDAR systems, the effects of vibrations and movement are decreased.

When the LIDAR sensing system 104 is installed at its location, the LIDAR sensor 210 may be externally calibrated by determining the position and orientation of the LIDAR sensor 210 relative to a local area coordinate system that is shared by each other sensor of the monitored area 102 and is defined with respect to the roadway. In turn, the relationship of the local area coordinate system with a global coordinate system or global map can be determined and fixed.

The data storage 212 may be embodied as any type of device or devices configured for short-term or long-term storage of data such as, for example, memory devices and circuits, memory cards, hard disk drives, solid-state drives, or other data storage devices. As shown in FIG. 2, the data storage 212 may store various data including LIDAR sensing data 250 and object detection models 252. The LIDAR sensing data 250 may be embodied as the raw LIDAR sensor data, the 3D point cloud data computed from the raw LIDAR sensor data, and/or object-based LIDAR sensing data computed from the 3D point cloud data. The object detection models 252 may be embodied as various models usable by machine learning algorithms to detect objects in the 3D point cloud data to generate the object-based LIDAR sensing data. As discussed in more detail below, the object detection models 252, as well as control parameters of the LIDAR sensing system 104, may be updated by the roadway server 106.

The communication subsystem 214 may be embodied as any type of communication circuit, device, or collection thereof, capable of enabling communications between the LIDAR sensing system 104 and the roadway server 106. To do so, the communication subsystem 214 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

Additionally, in some embodiments, the LIDAR sensing system 104 may include one or more peripheral devices 216. Such peripheral devices 216 may include any type of peripheral device commonly found in a compute device such as audio input devices, a display, other input/output devices, interface devices, and/or other peripheral devices.

Although the illustrative LIDAR sensing system 104 is shown in FIG. 2 and described above as including computing capabilities, it should be appreciated that the LIDAR sensing system 104 may be embodied as a "low featured" LIDAR sensing system 104 configured to produce raw LIDAR sensor data with no processing or only 3D cloud point data with no object detection information. In such embodiments, the LIDAR sensing system 104 may not include the compute circuitry 202 and/or other components described above or may include different components having reduced capability or functionality.

Figure 3:
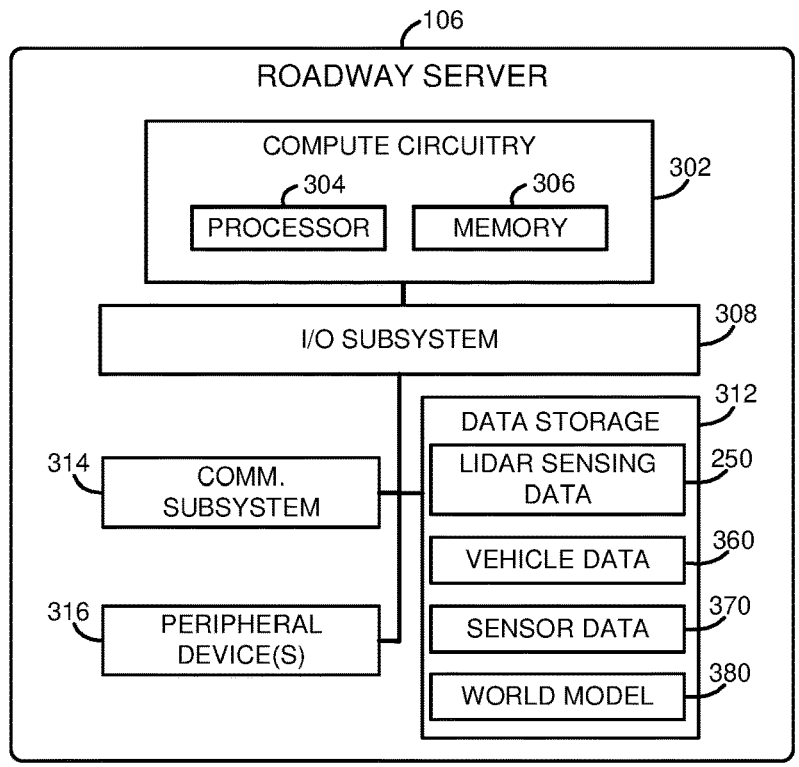
FIG. 3 is a simplified block diagram of at least one embodiment of a roadway server of the system of FIG. 1.

Referring now to FIG. 3, the roadway server 106 may be embodied as any type of compute device capable of receiving the LIDAR sensing data form the LIDAR sensing systems 104 and generating a world model of the monitored area 102 as discussed below. Although only a single roadway server 106 is shown in FIG. 1, it should be appreciated that the system 100 may include additional roadway server 106 in other embodiments based on, for example, the size and/or complexity of the monitored area 102. Illustratively, the roadway server 106 is located near or within the monitored area 102, near the roadway or intersection, to increase the communication capability of the roadway server 106 with the LIDAR sensing systems 104 and the automated vehicles 120.

The illustrative roadway server 106 of FIG. 3 includes compute circuitry 302, an input/output ("I/O") subsystem 308, a data storage 312, a communication subsystem 314, and, optionally, one or more peripheral devices 316. Of course, it should be appreciated that the roadway server 106 may include other or additional components, such as those commonly found in a typical compute device or server, in other embodiments. Additionally, in some embodiments, one or more of the illustrative components may be incorporated in, or otherwise form a portion of, another component.

The compute circuitry 302 may be embodied as any type of device or collection of devices capable of performing various compute functions (e.g., object detection) as described below. In some embodiments, the compute circuitry 302 may be embodied as a single device such as an integrated circuit, an embedded system, a field-programmable-array (FPGA, a system-on-a-chip (SOC), or other integrated system or device. Additionally, in some embodiments, the compute circuitry 302 includes or is embodied as a processor 304 and memory 306. The processor 304 may be embodied as any type of processor capable of performing the functions described herein. For example, the processor 304 may be embodied as a single or multi-core processor(s), digital signal processor, microcontroller, or other processor or processing/controlling circuit. Similarly, the memory 306 may be embodied as any type of volatile or non-volatile memory or data storage capable of performing the functions described herein.

The compute circuitry 302 is communicatively coupled to other components of the roadway server 106 via the I/O subsystem 308, which may be embodied as circuitry and/or components to facilitate input/output operations with compute circuitry 302 (e.g., with the processor 304 and/or memory 306) and other components of the roadway server 106. For example, the I/O subsystem 308 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 308 may be incorporated, along with the processor 304, the memory 306, and other components of the roadway server 106, into the compute circuitry 302.

The data storage 312 may be embodied as any type of device or devices configured for short-term or long-term storage of data such as, for example, memory devices and circuits, memory cards, hard disk drives, solid-state drives, or other data storage devices. As shown in FIG. 3, the data storage 312 may store various data including the LIDAR sensing data 250 received from the LIDAR sensing systems 104, vehicle sensing data 360 received from the automated vehicles 120, sensor data 370 received from other sensors of the monitored area such as the traffic cameras 124, and the world model data generated by the roadway server 106 based on the LIDAR sensing data 250, vehicle sensing data 360, and/or sensor data 370.

The communication subsystem 314 may be embodied as any type of communication circuit, device, or collection thereof, capable of enabling communications between the roadway server 106 and the LIDAR sensing systems 104, the automated vehicles 120, and other entities of the system 100 that may desire the world information from the roadway server 106. To do so, the communication subsystem 314 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

Additionally, in some embodiments, the roadway server 106 may include one or more peripheral devices 316. Such peripheral devices 316 may include any type of peripheral device commonly found in a compute device such as audio input devices, a display, other input/output devices, interface devices, and/or other peripheral devices.

Figure 4:
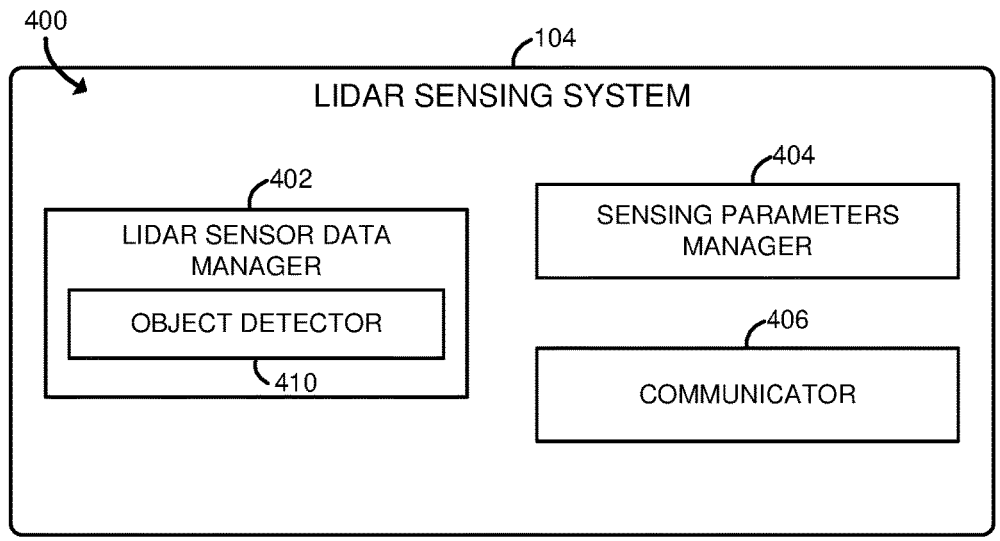
FIG. 4 is a simplified block diagram of at least one embodiment of an environment of the LIDAR sensing system of FIGS. 1 and 2.

Referring now to FIG. 4, in use, each LIDAR sensing system 104 establishes an illustrative environment 400 during operation. The illustrative environment 400 includes a LIDAR sensor data manager 402, a sensing parameters manager 404, and a communicator 406. Each of the various components of the environment 400 may be embodied as hardware, firmware, software, or a combination thereof. As such, in some embodiments, one or more of the components of the environment 400 may be embodied as circuitry or collection of electrical devices (e.g., LIDAR sensor data manager circuitry 402, a system parameters manager circuitry 404, and a communicator circuitry 406, etc.). It should be appreciated that one or more functions described herein as being performed by the LIDAR sensor data manager circuitry 402, the system parameters manager circuitry 404, and the communicator circuitry 406 may be performed, at least in part, by one or more other components of the LIDAR sensing system 104, such as the compute circuitry 202, the I/O subsystem 208, the communication subsystem 214, an ASIC, a programmable circuit such as an FPGA, and/or other components of the LIDAR sensing system 104. It should be further appreciated that associated instructions may be stored in the memory 206, the data storage device(s) 212, and/or another data storage location, which may be executed by processor 204 of the compute circuitry 202 and/or other computational processor of the LIDAR sensing system 104.

Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by one or more of the compute circuitry 202, the communication subsystem 214, and/or other software/hardware components of the LIDAR sensing system 104. It should be appreciated that the environment 400 of the LIDAR sensing system 104 may include other components, sub-components, modules, sub-modules, logic, sub-logic, and/or devices commonly found in a computing device (e.g., device drivers, interfaces, etc.), which are not illustrated in FIG. 4 for clarity of the description.

The LIDAR sensor data manager 402 is configured to manage the sensor data generated by the LIDAR sensor 210. In the illustrative embodiment, the LIDAR sensor data manager 402 is configured to receive the raw LIDAR sensor data from the LIDAR sensor 210 and process the raw LIDAR sensor data to generate the LIDAR sensing data. Such processing may include filtering, format conversions, object detection, tracking, and/or stat estimation. For example, in the illustrative embodiment, the LIDAR sensor data manager 402 filters and processes the raw LIDAR sensor data to generate the 3D point cloud data. Additionally, the LIDAR sensor data manager 402 includes an object detector 410 configured to perform various object detection processes on the 3D point cloud data to detect objects included therein and generate the object-based LIDAR sensing data. As discussed above, the object-based LIDAR sensing data is usable by the autonomous vehicles to facilitate navigation functions.

As discussed above, in other embodiments, the LIDAR sensing data produced by the LIDAR sensing system 104 is embodied as raw LIDAR sensor data or 3D point cloud data. In such embodiments, the LIDAR sensor data manager 402 may not include the object detector 410 and may not process the raw LIDAR sensor data received from the LIDAR sensor 210 or otherwise process such data only to generate the 3D point cloud data. In such embodiments, further processing of the LIDAR sensor data is offloaded to the roadway server 106.

The sensing parameters manager 404 is configured to manager various sensing parameters of the LIDAR sensing system 104. For example, the sensing parameters manager 404 may manage control parameters of the LIDAR sensor 210 that dictate the scanning rate, the resolution, and/or field of view of the LIDAR sensor 210. Additionally, in embodiments including the object detector 410, the sensing parameters manager 404 may manage the object detection models 252 used by the object detector 410 to detect and track objects of the 3D point cloud data indicative of objects located in the monitored area 102. As discussed in more detail below, the sensing parameters managed by the sensing parameters manager 404 may be periodically or responsively updated by the roadway server 106.

The communicator 408 is configured to manage communications between the LIDAR sensing system 104 and the roadway server 106. For example, as discussed in more detail below, the communicator 408 may transmit the LIDAR sensing data to the roadway server 106 and receive updated or new sensing parameters from the roadway server 106.

Figure 5:
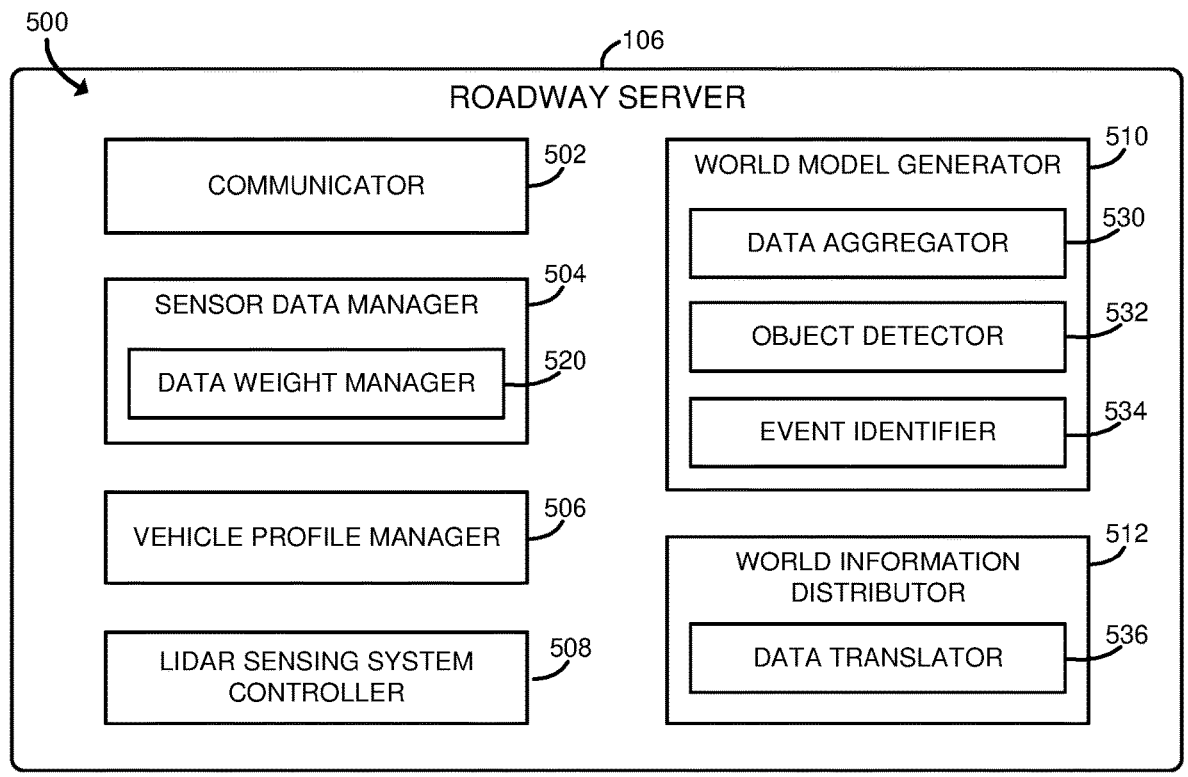
FIG. 5 is a simplified block diagram of at least one embodiment of an environment of the roadway server of FIGS. 1 and 3.

Referring now to FIG. 5, in use, the roadway server 106 establishes an illustrative environment 500 during operation. The illustrative environment 500 includes a communicator 502, a sensor data manager 504, a vehicle profile manager 506, a LIDAR sensing system controller 508, a world model generator 510, and a world information distributor 512. Each of the various components of the environment 500 may be embodied as hardware, firmware, software, or a combination thereof. As such, in some embodiments, one or more of the components of the environment 500 may be embodied as circuitry or collection of electrical devices (e.g., a communicator circuitry 502, a sensor data manager circuitry 504, a vehicle profile manager circuitry 506, a LIDAR sensing system controller circuitry 508, a world model generator circuitry 510, and a world information distributor circuitry 512, etc.). It should be appreciated that one or more functions described herein as being performed by the communicator circuitry 502, the sensor data manager circuitry 504, the vehicle profile manager circuitry 506, the LIDAR sensing system controller circuitry 508, the world model generator circuitry 510, and the world information distributor circuitry 512 may be performed, at least in part, by one or more other components of the roadway server 106, such as the compute circuitry 302, the I/O subsystem 308, the communication subsystem 314, an ASIC, a programmable circuit such as an FPGA, and/or other components of the roadway server 106. It should be further appreciated that associated instructions may be stored in the memory 306, the data storage device(s) 312, and/or another data storage location, which may be executed by processor 304 of the compute circuitry 302 and/or other computational processor of the roadway server 106.

Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by one or more of the compute circuitry 302, the communication subsystem 314, and/or other software/hardware components of the roadway server 106. It should be appreciated that the environment 500 of the roadway server 106 may include other components, sub-components, modules, sub-modules, logic, sub-logic, and/or devices commonly found in a server device (e.g., device drivers, interfaces, etc.), which are not illustrated in FIG. 5 for clarity of the description.

The communicator 502 is configured to manage communications between the roadway server 106 and the automated vehicles 120, as well as other devices of the system 100 configured to communicate with the roadway server 106 (e.g., to request the world model). For example, as discussed in more detail below, the communicator 502 receives the LIDAR sensing data from the LIDAR sensing system 104, vehicle sensing data from any participating automated vehicles 120, and/or sensor data from other sensors (e.g., the traffic camera 124) of the system 100. The communicator 502 is also configured to transmit the generated world model to interested automated vehicles 120 and other entities.

The sensor data manager 504 is configured to analyze and initially process any received sensing data (e.g., from the LIDAR sensing system 104 and/or the automated vehicles 120). For example, the sensor data manager 504 may filter the received sensing data and/or reconfigure or reformat the received sensing data to prepare it for further processing by the world model generator 510. In some embodiments, the sensor data manager 504 may include a data weight manager 520 configured to assign a weight to each received sensing data based on a corresponding confidence score or value of the sensing data. For example, the data weight manager 520 may apply a high weight value to the LIDAR sensing data received form the LIDAR sensing systems 104 because those systems are trusted and have a high confidence score. Alternatively, the data weight manager 520 may apply a lower weight value to vehicle sensing data received from an automated vehicle 120 because roadway server 106 may trust such data less than the data received from the LIDAR sensing systems 104. In some embodiments, the roadway server 106 may apply a weight value to any received vehicle sensing data based on profile information received from the automated vehicle 120. As discussed below, the profile information may define a context of the automated vehicle 120 such as its make, model, and equipment (e.g., what type of navigation sensor is being used). As such, an automated vehicle 120 having inferior navigation equipment may have a lower confidence score and any vehicle sensing data received from it may be weighted lower.

It should be appreciated that by weighting sensing data received from different sensors may allow the roadway server 106 to resolve any conflicts or ambiguities in the sensing data. For example, where a conflict in information occurs, the roadway server 106 may determine to utilize the sensing data having the highest weight.

The vehicle profile manager 506 is configured to receive profile information from subscribed automated vehicles 120 entering the monitored area 102. As discussed above, the profile information may include any type of information indicative of a context of the corresponding automated vehicle 120, such as make, model, equipment, and so forth. In some embodiments, the vehicle profile manager 506 may maintain and update the profile information for a particular automated vehicle 120 over time. In doing so, the confidence score of vehicle sensing data received from that automated vehicle 120 may change over time based on the determined accuracy or usefulness of the vehicle sensing data received from that particular automated vehicle 120.

The LIDAR sensing system controller 508 is configured to periodically or responsively update the sensing parameters used by the LIDAR sensing system 104. As discussed above, the sensing parameters may include control parameters of the LIDAR sensor 210 and/or object detection models 252. In some embodiments, the LIDAR sensing system controller 508 may update the sensing parameters in a dynamic manner based on, for example, objects or events identified in the monitored area 102. For example, LIDAR sensing system controller 508 may control a LIDAR sensing system 104 to focus on a particular sub-area of the monitored area 102 or on a particular object (e.g., to track the particular object through the monitored area 102). Additionally, LIDAR sensing system controller 508 may implement a learning technique to learn conditions or situations occurring in the monitored area 102 and modify the sensing parameters in anticipation of a reoccurrence of such conditions of situations (e.g., heavy traffic that occurs at a certain time of day or a high incidence of accidents at a particular spot and time of day). Furthermore, in some embodiments, the LIDAR sensing system controller 508 may allow direct human control over the sensing parameters and, as such, over the LIDAR sensing systems 104. In such embodiments, the LIDAR sensing system controller 508 may provide a suitable user interface to interact with the sensing parameters.

The world model generator 510 is configured to generate a world model of the monitored area 102 based on the sensing data received from the LIDAR sensing systems 104, as well as any vehicle sensing data received from automated vehicles 120 within or near the monitored area 102 and any others sensor data received from other sensors within the monitored area (e.g., the traffic camera 124). To do so, the world model generator 510 includes a data aggregator 530, which is configured to aggregate the sensing data received from the LIDAR sensing systems 104, the automated vehicles 120 102, and/or other sensors. In doing so, the data aggregator 530 correlates the various sensing data to develop a uniform and consistent world model of the monitored area. For example, the data aggregator 530 may filter, validate, stitch, and/or fuse sensing data together to generate the world model. As discussed above, in doing so, the data aggregator 530 may consider the weight of each received sensing data to resolve conflicts or ambiguities of the pool of received sensing data (e.g., the data aggregator 530 may rely on the LIDAR sensing data to a greater extent than the vehicle sensing data).

In generating the world model, the world model generator 510 processes the aggregated sensing data to detect, identify, and/or track objects included in the sensing data. To do so, the world model generator 510 may utilize any suitable object detection/recognition process or algorithm. In this way, the world model is an object-based data set usable by automated vehicles 120 to facilitate navigation through the monitored area. In some embodiments, the world model generator 510 may also include an event identifier 534. The event identifier 534 is configured to identify events occurring within the monitored area based on the world model. For example, the event identifier 534 may identify an accident, slowed traffic, a traffic jam, a hazardous situation, or other event. As discussed below, such event information may be useful to the automated vehicles 120 to plan navigation through, or around, the monitored area.

The world information distributor 512 is configured to respond to requests for the world model and transmit the world model to the requesting entity via the communicator 502. For example, automated vehicles 120 entering the monitored area may request the present world model of the monitored area to improve navigation there through. Additionally, other services, such as municipal services (e.g., traffic or infrastructure management services) may periodically request the world model. Of course, in other embodiments, the world information distributor 512 may distribute the world model in other ways, such as by a continuous or continual data stream, which may be listened to or subscribed to by interested devices and parties.

Because the automated vehicles 120 may utilize different formats of the high definition maps used for navigation, the world information distributor 512 may include a data translator 536. The data translator 536 is configured to translate the world model, or portions thereof, to a format usable by the interested automated vehicle 120. To do so, the data translator 536 may utilize the profile information associated with the interested automated vehicle 120, which may identify the required format or navigation equipment used by the automated vehicle 120.

Figure 6:
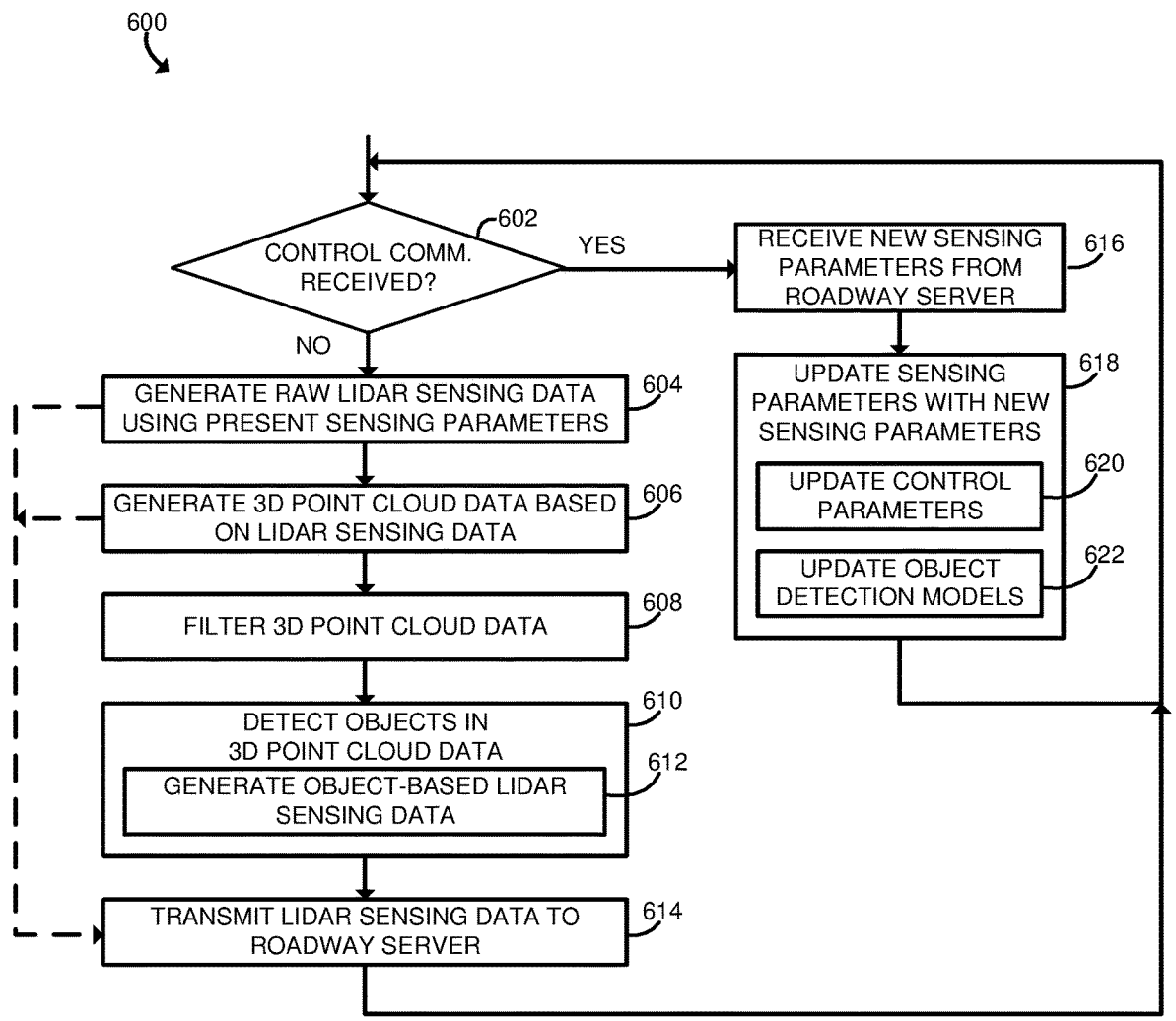
FIG. 6 is a simplified block diagram of at least one embodiment of method for sensing world data, which may be executed by the LIDAR sensing system of FIGS. 2 and 4.

Referring now to FIG. 6, during operation, each LIDAR sensing system 104 may execute a method 600 for sensing world data. The method 600 begins with block 602 in which the LIDAR sensing system 104 determines whether a control communication has been received from the roadway server 106. If not, the method 600 advances to block 604 in which the LIDAR sensor 210 of the LIDAR sensing system 104 generates the raw LIDAR sensor data indicative of objects within the monitored area. In doing so, the LIDAR sensor 210 utilizes the present sensing parameters (e.g., the scanning rate, resolution, and field of view). Subsequently, in block 606, the LIDAR sensing system 104 generates the 3D point cloud data based on the LIDAR sensing data and filters the 3D point cloud data in block 608 to remove any inconsistencies in the data.

In block 610, the LIDAR sensing system 104 may detect objects indicated in the 3D point cloud data and generate object-based LIDAR sensing data in block 612. As discussed above, the object-based LIDAR sensing data identifies objects detected in the monitored area 102 and may be used by automated vehicles 120 to navigation through the monitored area 102. Subsequently in block 614, the LIDAR sensing system 104 transmits the LIDAR sensing data to the roadway server 106. In embodiments in which the LIDAR sensing system 104 is not configured to generate the object-based LIDAR sensing data, the method 600 may advance from block 604 or block 606 to block 614 and transmit the raw LIDAR sensing data or the 3D point cloud data directly to the roadway server 106. In either case, the method 600 loops back to block 602 in which the LIDAR sensing system 104 determines whether a control communication has been received from the roadway server 106.

If, in block 602, the LIDAR sensing system 104 determines that a control communication has been received, the method 600 advances to block 616 in which the LIDAR sensing system 104 receives new sensing parameters from the roadway server 106. As discussed above, the new sensing parameters may be embodied as control parameters that control the operation of the LIDAR sensor 210 and/or object detection models 252 usable by the LIDAR sensing system 104 to detect objects in the 3D point cloud in block 610. Once the LIDAR sensing system 104 receives the new sensing parameters, the LIDAR sensing system 104 updates the sensing parameters in block 618. For example, in block 620, the LIDAR sensing system 104 may update the control parameters (e.g., the scanning rate, resolution, and field of view) and, in block 622, the LIDAR sensing system 104 may update the object detection models. After the sensing parameters have been updated, the method 600 loops back to block 602 in which the LIDAR sensing system 104 determines whether a control communication has been received from the roadway server 106.

Figure 7:
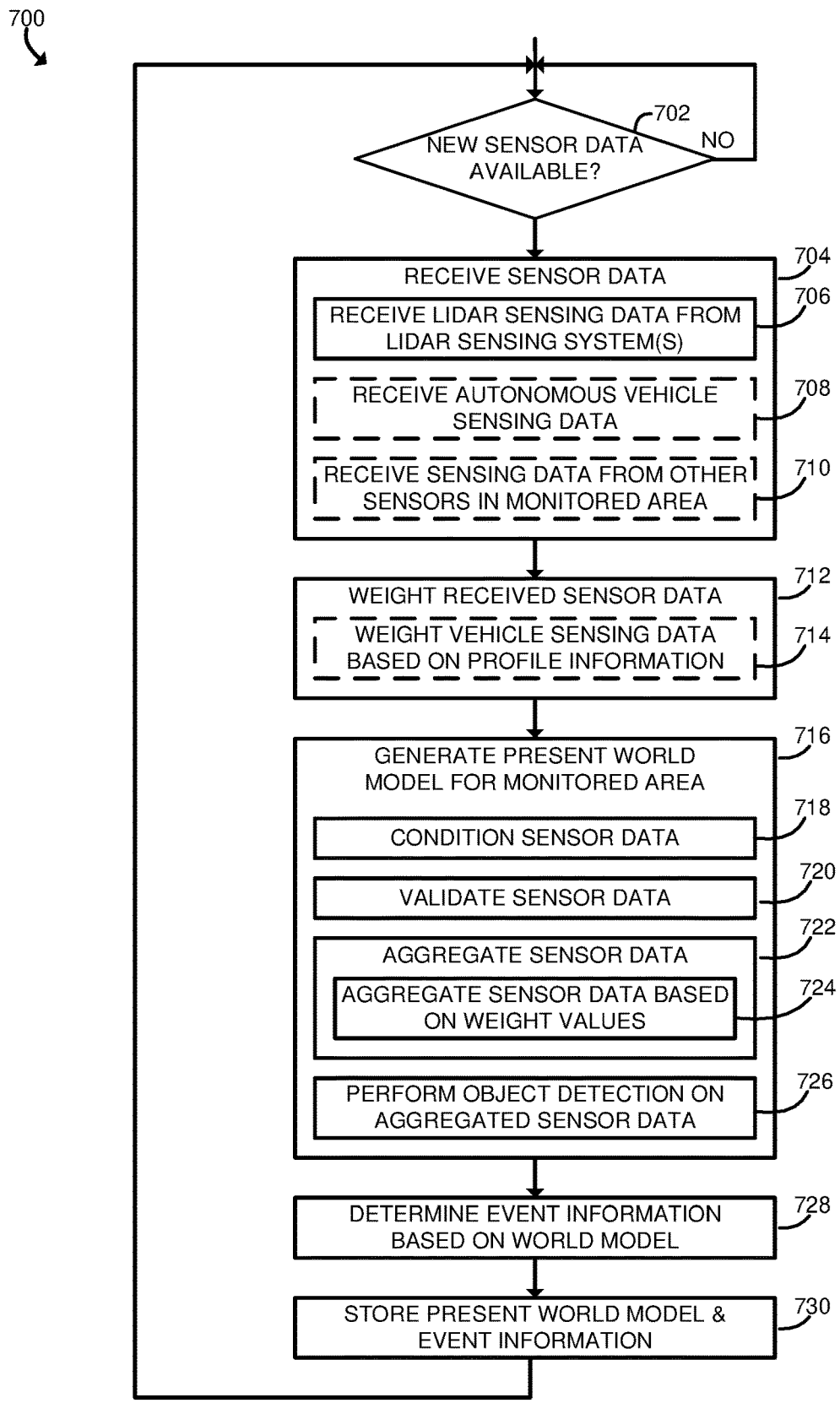
FIG. 7 is a simplified block diagram of at least one embodiment of method for generating a world model of a monitored area, which may be executed by the roadway server of FIGS. 3 and 5.

Referring now to FIG. 7, during operation, the roadway server 106 may execute a method 700 for generating a world model of the monitored area. The method 700 begins with block 702 in which the roadway server 106 determines whether new sensor data is available. That is, in some embodiments, the LIDAR sensing systems 104 and the automated vehicles 120 may automatically, periodically, or responsively transmit their respective sensing data to the roadway server 106. Alternatively, in other embodiments, the roadway server 106 may be configured to poll the LIDAR sensing systems 104 and/or automated vehicles 120.

Regardless, if the roadway server 106 determines that new sensor data is available, the method 700 advances to block 704 in which the roadway server 106 receives the sensor data. For example, in block 706, the roadway server 106 may receive the LIDAR sensing data from one or more of the LIDAR sensing systems 104. Additionally, in some embodiments, the roadway server 106 may receive vehicle sensing data from one or more automated vehicles 120 in block 708 and/or receive sensing data from other sensors located within the monitored area 102 in block 710.

After the roadway server 106 receives the sensor data, the method 700 advances to block 712 in which the roadway server 106 weights the various received sensor data. To do so, as discussed above, the roadway server 106 assigns a weight to each received sensing data based on a corresponding confidence score or value of the received sensing data. For example, the roadway server 106 may apply a relatively high weight value to the LIDAR sensing data received form the LIDAR sensing systems 104 because those systems are trusted and have a high confidence score. Alternatively, the data weight manager 520 may apply a lower weight value to vehicle sensing data received from an automated vehicle 120 because the roadway server 106 may trust such data less than the data received from the LIDAR sensing systems 104. To do so, in some embodiments in block 714, the roadway server 106 may apply a weight value to any received vehicle sensing data based on profile information associated with the automated vehicle 120, which may be managed and/or maintained by the roadway server 106 in some embodiments.

After the roadway server 106 has applied the corresponding weights to the received sensing data, the method 700 advances to block 716 in which the roadway server 106 generates a present world model of the monitored area 102. To do so, the roadway server 106 may process the received sensing data in various ways. For example, in block 718, the roadway server 106 may condition the sensor data. That is, the roadway server 106 may filter and/or reformat the received sensing data to place the sensing data in a condition for further processing and aggregation. For example, the roadway server 106 may reformate or translated the received sensing data into a common format to facilitate the aggregation or stitching of the sensing data. Additionally, in block 720, the roadway server 106 may validate the received sensing data. For example, the roadway server 106 may resolve any ambiguities or conflicts in the received sensing data (e.g., a conflict or difference between the LIDAR sensing data and the vehicle sensing data). In doing so, as discussed above, the roadway server 106 may utilize the weight value assigned to each received sensing data.

In block 722, the roadway server 106 aggregates the sensing data received from the LIDAR sensing systems 104 and, if any, from the automated vehicles 120 and/or other sensors. In doing so, the roadway server 106 correlates the various sensing data to develop a uniform and consistent world model of the monitored area. In doing so, the roadway server 106 may consider the weight of each received sensing data in block 724. Additionally, in block 726, the roadway server 106 may perform an object detection process on the aggregated sensing data to detect, identify, and/or track objects included in the sensing data. As discussed above, the roadway server 106 may utilize any suitable object detection/recognition process or algorithm. In this way, the generated world model is an object-based data set usable by automated vehicles 120 to facilitate navigation through the monitored area 102.

Figure 8:
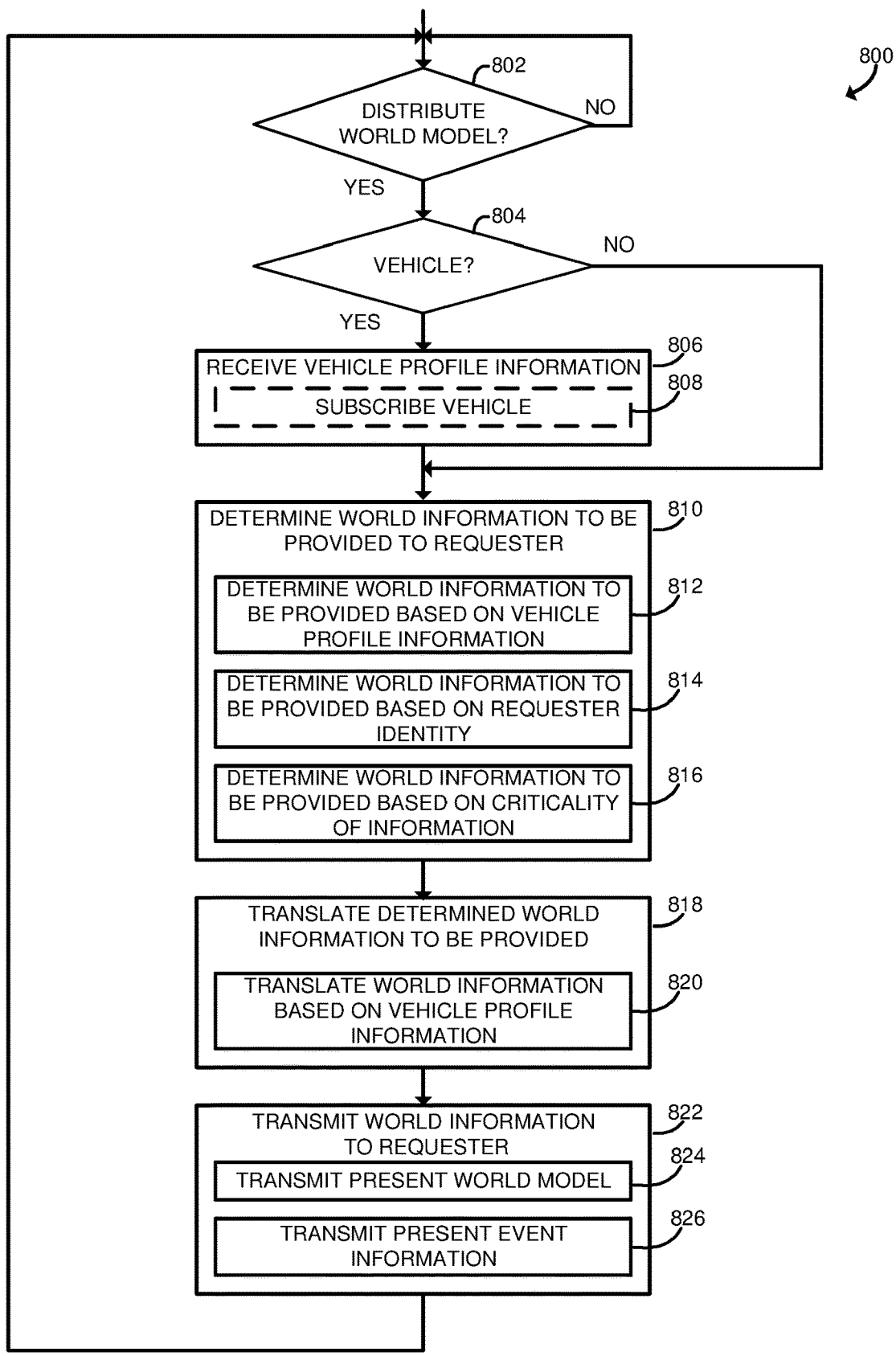
FIG. 8 is a simplified block diagram of at least one embodiment of method for distributing world information, which may be executed by the roadway server of FIGS. 3 and 5.

After the roadway server 106 has generated the world model in block 716, the method advances to block 728. In block 728, the roadway server determines event information based on the world model. To do so, the roadway server 106 may identify events occurring within the monitored area 102 based on analysis of the generated world model. Such event information may include identification an accident, slowed traffic, a traffic jam, a hazardous situation, or other event occurring in the monitored area. The roadway server 106 subsequently stores the world model and the event information as world information in the data storage 312, and the method 700 loops back to block 702 in which the roadway server 106 determines whether new sensor data is available Referring now to FIG. 8, during operation, the roadway server 106 may execute a method 800 for distributing world information. The method 800 begins with block 802 in which the roadway server 106 determines whether to distribute the world mode to entities of interest (e.g., the automated vehicles 120, emergency services, surveillance or security services, infrastructure or maintenance services, traffic management services, commerce services, and/or other interested entities). The roadway server 106 may determine to distribute the world model based on a request received from an automated vehicle 120 or other interested entity or may distribute the world model using a streaming protocol like a broadcast, which interested parties can subscribe to or listen to obtain the world model and information. The roadway server 106 may stream such information continually or periodically.

If the roadway server 106 determines distribute the world model, the method 800 advances to block 804 in which the roadway server 106 determines whether the interested party is an automated vehicle 120. If so, the method 800 advances to block 806 in which the roadway server 106 receives profile information from the automated vehicle 120. As discussed above, the profile information may include any type of information indicative of a context of the corresponding automated vehicle 120, such as make, model, equipment, and so forth. Each automated vehicle 120 may be configured to contact the roadway server 106 when approaching the monitored area based on knowledge of the roadway server 106 or in response to a beacon transmitted by the roadway server 106 or the like. Additionally, in some embodiments, the roadway server 106 is configured to subscribe the automated vehicle 120 in block 808 such that the profile information can be maintained over time (e.g., the roadway server 106 may adjust a confidence score associated with the profile information over time based on historical interactions).

If roadway server 106 determines that the interested party is not an automated vehicle 120 in block 804 or after the profile information of the automated vehicle 120 has been received in block 806, the method 800 advances to block 810 in which the roadway server 106 determines the world information to be provided to the interested party. That is, in some embodiments, the roadway server 106 may determine how much of or to what detail the world model should be provided to the interested party and which event information should be provided. For example, in block 812, the roadway server 106 may determine the world information to be provided based on the profile information associated with an automated vehicle 120. Additionally or alternatively, the roadway server 106 may determine the world information to be provided based on an identity of the interested party in block 814 and/or based on the criticality of the world information in block 816. For example, information determined to be critical may be provided to all interested parties.

After the roadway server 106 has determined the world information to be provided, the method 700 advances to block 818 in which the roadway server translates the determined world information. That is, the roadway server 106 may translate the determine world information into a format or data structure acceptable by the interested party. For example, in block 820, the roadway server 106 may translate the determine world information based on the profile information associated with an automated vehicle 120, which may define the type of navigation equipment or data used by the automated vehicle 120.

Subsequently, in block 822, the roadway server 106 transmits the determined and translated world information to the interested party (e.g., an interested automated vehicle 120). For example, the roadway server 106 may transmit the present world model, or subset thereof, in block 824 and/or transmit the present event information, or subset thereof, in block 826. Regardless, after the roadway server 106 transmits the world information to the interested party in block 822, the method 800 loops back to block 802 in which the roadway server determines whether to distribute the world model again.

Figure 9:
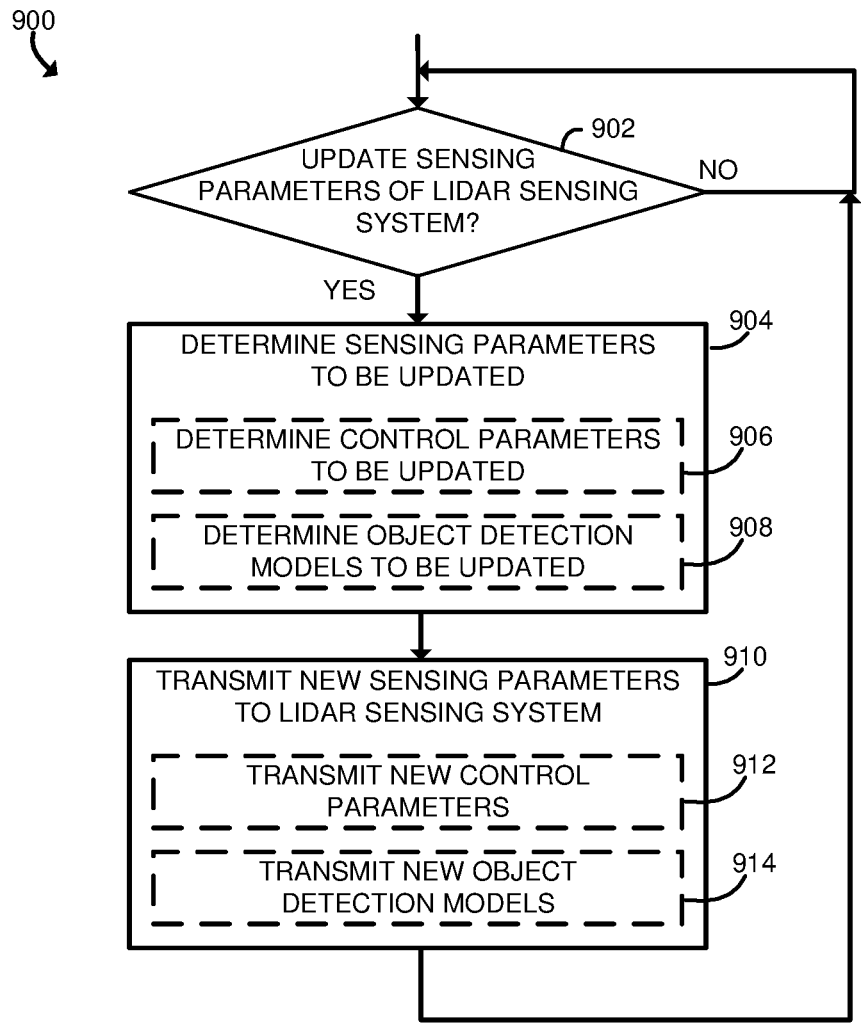
FIG. 9 is a simplified block diagram of at least one embodiment of a method for updating sensing parameters of the LIDAR sensing system of FIGS. 2 and 4, which may be executed by the roadway server of FIGS. 3 and 5.

Referring now to FIG. 9, during operation, the roadway server 106 may execute a method 900 for updating the sensing parameters of one or more of the LIDAR sensing systems 104 of the system 100. The method 900 begins with block 902 in which the roadway server 106 determines whether to update the sensing parameters of the LIDAR sensing systems 104. As discussed above, roadway server 106 may determine to update the sensing parameters periodically or in a dynamic manner based on, for example, objects or events identified in the monitored area 102. If the roadway server 106 determines to update the sensing parameters, the method 900 advances to block 904 in which the roadway server 106 determines which sensing parameters are to be updated. For example, the roadway server 106 may determine to update the control parameters in block 906 and/or the detection models in block 908. Regardless, after the roadway server 106 has determined those sensing parameters to be updated, the method 900 advances to block 910 in which the roadway server 106 transmits the new sensing parameters to the LIDAR sensing system 104. For example, the roadway server 106 may transmit the new control parameters in block 912 and/or the detection models in block 914. Once the roadway server 106 has transmitted the new sensing parameters, the method 900 loops back to block 902 in which the roadway server 106 determines whether to update the sensing parameters of the LIDAR sensing systems 104 again.

EXAMPLES

Illustrative examples of the technologies disclosed herein are provided below. An embodiment of the technologies may include any one or more, and any combination of, the examples described below.

Example 1 includes a roadway server to manage a world map of a monitored area. The roadway server includes a sensor data manager to receive Light Detection and Ranging (LIDAR) sensing data from a LIDAR sensing system positioned to monitor the monitored area; a world model generator to generate a world model of the monitored area based on the LIDAR sensing data, wherein the world model describes objects located in the monitored area; and a world information distributor to transmit the world model to an automated vehicle to facilitate navigation of the vehicle in the monitored area.

Example 2 includes the subject matter of Example 1, and wherein to receive the LIDAR sensing data comprises to receive raw LIDAR sensor data, three dimensional (3D) point cloud data, or LIDAR sensor data indicative of objects detected in the monitored area.

Example 3 includes the subject matter of Example 1 or 2, and wherein the sensor data manager is to receive LIDAR sensing data from a LIDAR sensing system positioned adjacent to a roadway intersection.

Example 4 includes the subject matter of any of Examples 1-3, and wherein the sensor data manager is further to receive vehicle sensing data from the automated vehicle, the vehicle sensing data being indicative of objects located in the monitored area and sensed by the automated vehicle using sensors of the automated vehicle, and wherein the world model generator is to generate the world model based on the LIDAR sensing data and the vehicle sensing data.

Example 5 includes the subject matter of any of Examples 1-4, and wherein to generate the world model based on the LIDAR sensing data and the vehicle sensing data comprises to apply a first weight to the LIDAR sensing data; apply a second weight to the vehicle sensing data based; and aggregate the LIDAR sensing data and the vehicle sensing data based on the first and second weights to generate the world model.

Example 6 includes the subject matter of any of Examples 1-5, and wherein the world model generator is further to determine event information indicative of an event occurring in the monitored area based on the world model and wherein the world information distributor is further to distribute the event information with the world model to the automated vehicle.

Example 7 includes the subject matter of any of Examples 1-6, and wherein to transmit the world model to the automated vehicle comprises to translate data of the world model based on profile information associated with the automated vehicle, wherein the profile information defines a context of the vehicle.

Example 8 includes the subject matter of any of Examples 1-7, and wherein to transmit the world model to the automated vehicle comprises to transmit the world model to the automated vehicle prior to the automated vehicle entering the monitored area.

Example 9 includes the subject matter of any of Examples 1-8, and further comprising a LIDAR sensing system controller to determine whether to update sensing parameters of the LIDAR sensing system and transmit updated sensing parameters to the LIDAR sensing system in response to a determination to update the sensing parameters, wherein the sensing parameters define operation characteristics of the LIDAR sensing system.

Example 10 includes a method for managing a world map of a monitored area. The method includes receiving, by a roadway server located at the monitored area, Light Detection and Ranging (LIDAR) sensing data from a LIDAR sensing system positioned to monitor the monitored area; generating, by the roadway server, a world model of the monitored area based on the LIDAR sensing data, wherein the world model describes objects located in the monitored area; and transmitting, by the roadway server, the world model to the automated vehicle to facilitate navigation of the automated vehicle in the monitored area.

Example 11 includes the subject matter of Example 10, and wherein receiving the LIDAR sensing data comprises receiving the LIDAR sensing data form a LIDAR sensing system positioned adjacent to a roadway intersection.

Example 12 includes the subject matter of Example 10 or 11, and further comprising receiving, by the roadway server, vehicle sensing data from the automated vehicle, wherein the vehicle sensing data is indicative of objects located in the monitored area and sensed by the automated vehicle using sensors of the automated vehicle, and wherein generating the world model comprises generating a world model based on the LIDAR sensing data and the vehicle sensing data.

Example 13 includes the subject matter of any of Examples 10-12, and wherein generating the world model based on the LIDAR sensing data and the vehicle sensing data comprises applying a first weight to the LIDAR sensing data; applying a second weight to the vehicle sensing data; and aggregating the LIDAR sensing data and the vehicle sensing data based on the first and second weights to generate the world model.

Example 14 includes the subject matter of any of Examples 10-13, and further comprising determining, by the roadway server, event information indicative of an event occurring in the monitored area based on the world model; and distributing, by the roadway server, the event information with the world model to the automated vehicle.

Example 15 includes the subject matter of any of Examples 10-14, and transmitting the world model to the automated vehicle comprises translating data of the world model based on profile information associated with the automated vehicle, wherein the profile information defines a context of the vehicle.

Example 16 includes the subject matter of any of Examples 10-15, and transmitting the world model to the automated vehicle comprises transmitting the world model to the automated vehicle prior to the automated vehicle entering the monitored area.

Example 17 includes the subject matter of any of Examples 10-16, and further comprising determining, by the roadway server, whether to update sensing parameters of the LIDAR sensing system; and transmitting updated sensing parameters to the LIDAR sensing system in response to a determination to update the sensing parameters, wherein the sensing parameters define operation characteristics of the LIDAR sensing system.

Example 18 includes one or more machine-readable storage media comprising a plurality of instructions stored thereon that, when executed, cause a roadway server located at a monitored area to receive Light Detection and Ranging (LIDAR) sensing data from a LIDAR sensing system positioned to monitor the monitored area; generate a world model of the monitored area based on the LIDAR sensing data, wherein the world model identifies objects located in the monitored area; and transmit the world model to the automated vehicle to facilitate navigation of the automated vehicle in the monitored area.

Example 19 includes the subject matter of Example 18, and wherein to receive the LIDAR sensing data comprises to receive the LIDAR sensing data form a LIDAR sensing system positioned adjacent to a roadway intersection.

Example 20 includes the subject matter of Example 18 or 19, and wherein the plurality of instructions, when executed, further cause the roadway server to receive vehicle sensing data from the automated vehicle, wherein the vehicle sensing data is indicative of objects located in the monitored area and sensed by the automated vehicle using sensors of the automated vehicle, and wherein to generate the world model comprises to generate a world model based on the LIDAR sensing data and the vehicle sensing data.

Example 21 includes the subject matter of any of Example 18-20, and wherein to generate the world model based on the LIDAR sensing data and the vehicle sensing data comprises to apply a first weight to the LIDAR sensing data; apply a second weight to the vehicle sensing data; and aggregate the LIDAR sensing data and the vehicle sensing data based on the first and second weights to generate the world model.

Example 22 includes the subject matter of any of Example 18-21, and wherein the plurality of instructions, when executed, further cause the roadway server to determine event information indicative of an event occurring in the monitored area based on the world model; and distribute the event information with the world model to the automated vehicle.

Example 23 includes the subject matter of any of Example 18-22, and wherein to transmit the world model to the automated vehicle comprises to translate data of the world model based on profile information associated with the automated vehicle, wherein the profile information defines a context of the vehicle.

Example 24 includes the subject matter of any of Example 18-23, and wherein to transmit the world model to the automated vehicle comprises to transmit the world model to the automated vehicle prior to the automated vehicle entering the monitored area.

Example 25 includes the subject matter of any of Example 18-24, and wherein the plurality of instructions, when executed, further cause the roadway server to determine whether to update sensing parameters of the LIDAR sensing system; and transmit the updated sensing parameters to the LIDAR sensing system in response to a determination to update the sensing parameters, wherein the sensing parameters define operation characteristics of the LIDAR sensing system.

The invention claimed is:

1. A roadway server to manage a world map of a monitored area, the roadway server comprising:
   a sensor data manager to:
      receive Light Detection and Ranging (LIDAR) sensing data from a LIDAR sensing system positioned to monitor the monitored area; and
      receive vehicle sensing data from a first automated vehicle of a plurality of automated vehicles, the vehicle sensing data being indicative of objects located in the monitored area and sensed by the first automated vehicle using at least one sensor of the first automated vehicle;
   a world model generator comprising circuitry to generate a world model of the monitored area based on the LIDAR sensing data and the vehicle sensing data, wherein the world model describes objects located in the monitored area, wherein generating the world model comprises applying a first weight to the LIDAR sensing data, applying a second weight to the vehicle sensing data, and aggregating the LIDAR sensing data and the vehicle sensing data based on the first and second weights; and
   a world information distributor to transmit the world model to a plurality of automated vehicles to facilitate navigation of the automated vehicles in the monitored area.

2. The roadway server of claim 1, wherein to receive the LIDAR sensing data comprises to receive raw LIDAR sensor data, three dimensional (3D) point cloud data, or LIDAR sensor data indicative of objects detected in the monitored area.

3. The roadway server of claim 1, wherein the sensor data manager is to receive LIDAR sensing data from a LIDAR sensing system positioned adjacent to a roadway intersection.

4. The roadway server of claim 1, wherein the world model generator is further to determine event information indicative of an event occurring in the monitored area based on the world model and wherein the world information distributor is further to distribute the event information with the world model to the automated vehicle.

5. The roadway server of claim 1, wherein to transmit the world model to the automated vehicle comprises to translate data of the world model based on profile information associated with the automated vehicle, wherein the profile information defines a context of the vehicle.

6. The roadway server of claim 1, wherein to transmit the world model to the automated vehicle comprises to transmit the world model to the automated vehicle prior to the automated vehicle entering the monitored area.

7. The roadway server of claim 1, further comprising a LIDAR sensing system controller to determine whether to update sensing parameters of the LIDAR sensing system and transmit updated sensing parameters to the LIDAR sensing system in response to a determination to update the sensing parameters, wherein the sensing parameters define operation characteristics of the LIDAR sensing system.

8. A method for managing a world map of a monitored area, the method comprising:
receiving, by a roadway server located at the monitored area, Light Detection and Ranging (LIDAR) sensing data from a LIDAR sensing system positioned to monitor the monitored area and vehicle sensing data from a first automated vehicle of a plurality of automated vehicles, the vehicle sensing data being indicative of objects located in the monitored area and sensed by the first automated vehicle using at least one sensor of the first automated vehicle;
generating, by the roadway server, a world model of the monitored area based on the LIDAR sensing data and the vehicle sensing data, wherein the world model describes objects located in the monitored area, wherein generating the world model comprises applying a first weight to the LIDAR sensing data, applying a second weight to the vehicle sensing data, and aggregating the LIDAR sensing data and the vehicle sensing data based on the first and second weights; and
transmitting, by the roadway server, the world model to a plurality of automated vehicles to facilitate navigation of the automated vehicles in the monitored area.

9. The method of claim 8, wherein receiving the LIDAR sensing data comprises receiving the LIDAR sensing data form a LIDAR sensing system positioned adjacent to a roadway intersection.

10. The method of claim 8, further comprising:
determining, by the roadway server, event information indicative of an event occurring in the monitored area based on the world model; and
distributing, by the roadway server, the event information with the world model to the automated vehicle.

11. The method of claim 8, wherein transmitting the world model to the automated vehicle comprises translating data of the world model based on profile information associated with the automated vehicle, wherein the profile information defines a context of the vehicle.

12. The method of claim 8, wherein transmitting the world model to the automated vehicle comprises transmitting the world model to the automated vehicle prior to the automated vehicle entering the monitored area.

13. The method of claim 8, further comprising:
determining, by the roadway server, whether to update sensing parameters of the LIDAR sensing system; and
transmitting updated sensing parameters to the LIDAR sensing system in response to a determination to update the sensing parameters, wherein the sensing parameters define operation characteristics of the LIDAR sensing system.

14. One or more non-transitory machine-readable storage media comprising a plurality of instructions stored thereon that, when executed, cause a roadway server located at a monitored area to:
access Light Detection and Ranging (LIDAR) sensing data received from a LIDAR sensing system positioned to monitor the monitored area;
access vehicle sensing data received from a first automated vehicle of a plurality of automated vehicles, the vehicle sensing data being indicative of objects located in the monitored area and sensed by the first automated vehicle using at least one sensor of the first automated vehicle;
generate a world model of the monitored area based on the LIDAR sensing data and the vehicle sensing data, wherein the world model identifies objects located in the monitored area, wherein generating the world model comprises applying a first weight to the LIDAR sensing data, applying a second weight to the vehicle sensing data, and aggregating the LIDAR sensing data and the vehicle sensing data based on the first and second weights; and
transmit the world model to a plurality of automated vehicles to facilitate navigation of the automated vehicles in the monitored area.

15. The one or more machine-readable storage media of claim 14, wherein to receive the LIDAR sensing data comprises to receive the LIDAR sensing data form a LIDAR sensing system positioned adjacent to a roadway intersection.

16. The one or more machine-readable storage media of claim 14, wherein the plurality of instructions, when executed, further cause the roadway server to:
determine event information indicative of an event occurring in the monitored area based on the world model; and
distribute the event information with the world model to the automated vehicle.

17. The one or more machine-readable storage media of claim 14, wherein to transmit the world model to the automated vehicle comprises to translate data of the world model based on profile information associated with the automated vehicle, wherein the profile information defines a context of the vehicle.

18. The one or more machine-readable storage media of claim 14, wherein to transmit the world model to the automated vehicle comprises to transmit the world model to the automated vehicle prior to the automated vehicle entering the monitored area.

19. The one or more machine-readable storage media of claim 14, wherein the plurality of instructions, when executed, further cause the roadway server to:
determine whether to update sensing parameters of the LIDAR sensing system; and
transmit the updated sensing parameters to the LIDAR sensing system in response to a determination to update the sensing parameters, wherein the sensing parameters define operation characteristics of the LIDAR sensing system.

* * * * *